(12) United States Patent
Motosko (10) Patent No.: US 7,103,309 B1
(45) Date of Patent: Sep. 5, 2006

(54) EDUCATIONAL DEVICE (76) Inventor: Stephen J. Motosko, 132 Sand Dollar La., Sarasota, FL (US) 34242

( * ) Notice: Subject to any disclaimer, the term of this patent is extended or adjusted under 35 U.S.C. 154(b) by 379 days.

(21) Appl. No.: 10/643,823

(22) Filed: Aug. 19, 2003

(51) Int. Cl.
*G09B 5/00* (2006.01)

(52) U.S. Cl. ...................................... 434/308; 446/298

(58) Field of Classification Search ............... 434/318; 446/266, 236
See application file for complete search history.

(56) References Cited

U.S. PATENT DOCUMENTS

| | | | | |
|---|---|---|---|---|
| 3,383,114 A | * | 5/1968 | Ryan | 369/30.02 |
| 3,554,556 A | * | 1/1971 | Stewart | 434/318 |
| 3,711,964 A | * | 1/1973 | Folson et al. | 434/318 |
| 4,280,809 A | | 7/1981 | Greenberg et al. | |
| 4,482,329 A | | 11/1984 | Shindo | |
| 4,651,613 A | * | 3/1987 | Harrison | 84/95.2 |
| 4,997,374 A | | 3/1991 | Simone | |
| 5,382,188 A | * | 1/1995 | Tomellini | 446/397 |
| 5,413,355 A | | 5/1995 | Gonzalez | |
| 5,478,240 A | | 12/1995 | Cogliano | |
| 5,595,489 A | | 1/1997 | Kwon | |
| 5,944,533 A | | 8/1999 | Wood | |
| 6,017,260 A | * | 1/2000 | Dolan | 446/298 |
| 6,109,925 A | | 8/2000 | Druckman | |
| 6,264,523 B1 | | 7/2001 | Simmons | |
| 6,454,627 B1 | * | 9/2002 | Mak | 446/369 |
| 6,648,647 B1 | * | 11/2003 | Wood et al. | 434/174 |
| 2001/0034181 A1 | * | 10/2001 | Bakst | 446/242 |

OTHER PUBLICATIONS

Web page,"HowStuffWorks," at URL=htpp://web.archive.org/web/*/http://entertainment.howstuffworks.com, 7 pages, (2003).*

* cited by examiner

*Primary Examiner*—Robert Olszewski
*Assistant Examiner*—Kesha Y. Frisby
(74) *Attorney, Agent, or Firm*—Charles J. Prescott (57) ABSTRACT

An audio-visual educational device including a housing including a plurality of separate viewable indicia each representative of an object which produces a distinctive audible sound associated with the corresponding object. A sound emitting area is also provided in the housing in close proximity to each object. An electronic controller operably mounted in the housing selectively produces and emits or causes to be emitted through an audio output device each of the distinctive audible sounds from the corresponding sound emitting area responsive to manual selection of one viewable indicia. The user then receives an audible queue in the form of the audible sound to look in the direction of sound emanating from the corresponding sound emitting area thereby learning to associate the selected viewable object with its corresponding audible sound.

9 Claims, 10 Drawing Sheets

EDUCATIONAL DEVICE

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to electronic educational devices, and more particularly to an audio-visual learning device for teaching small children by association of an object such as a musical instrument or an animal which produces a distinctive sound with the viewable indicia associated therewith and description thereof.

2. Description of Related Art

The availability and relative low cost of electronic education and training devices and systems have had a great influence upon educating people, particularly younger children. By the inclusion of inexpensive yet extremely powerful CPUs, audio synthesizers and the like which may both control system operation and selective synthesized audible words, music and sounds, the scope of these educational and entertainment devices for children, even for families with modest means, has greatly increased.

Examples of such electronic educational and entertainment toys and devices are disclosed in the following U.S. patents.

U.S. Pat. No. 4,280,809 to Greenberg, et al.
U.S. Pat. No. 4,482,329 to Shindo
U.S. Pat. No. 4,997,374 to Simone
U.S. Pat. No. 5,413,355 to Gonzalez
U.S. Pat. No. 5,478,240 to Cogliano
U.S. Pat. No. 5,595,489 to Kwon
U.S. Pat. No. 5,944,533 to Wood
U.S. Pat. No. 6,109,925 to Druckman, et al.
U.S. Pat. No. 6,264,523 to Simmons However, none of these prior art disclosures appear to capture the powerful educational tool of teaching a child to be directed to a viewable indicia representative of an object by directing the child's visual attention toward distinctive synthesized sound produced by the object which emanates from that viewable indicia. This educational technique of the present invention draws the attention of listening and eyesight of the child to viewable indicia in the form of either a graphic display of an object and/or the word describing the object itself by a sound which synthesizes that which is typically associated with the object itself. For example, if one of the objects displayed graphically on the invention is a cow, a graphic display of a cow will be presented at one location on the device immediately adjacent to which the word "cow" appears in large letters. When the child or attendant selects that viewable indicia by manual activation, the sound emitted by a cow, e.g. "mooooooooooo" will emanate from a sound emitting area immediately adjacent or in very close proximity to the viewable indicia itself such that the eye and listening attention of the child is directed to and focused on the viewable indicia by the sound which emanates therefrom.

BRIEF SUMMARY OF THE INVENTION

This invention is directed to an audio-visual educational device including a housing including a plurality of separate viewable indicia each representative of an object which produces a distinctive audible sound associated with the corresponding object. A sound emitting area is also provided in the housing in close proximity to each object. An electronic controller operably mounted in the housing selectively produces and emits or causes to be emitted through an audio output device each of the distinctive audible sounds from the corresponding sound emitting area responsive to manual selection of one viewable indicia. The user then receives an audible queue in the form of the audible sound to look in the direction of sound emanating from the corresponding sound emitting area thereby learning to associate the selected viewable object with its corresponding audible sound.

It is therefore an object of this invention to provide an educational toy or device for children which utilizes an audio-visual technique of drawing and focusing the attention of the child to a selected viewable indicia of an object by the characteristic sound of the object and emitting the sound from a point immediately adjacent to the viewable indicia.

Still another object of this invention is to provide an educational audio-visual toy for children which incorporates sound direction to draw the attention of the child to a particular location on the device and, in doing so, to cause the child to look directly at viewable indicia or representation of the object which produces the characteristic sound which emanates from that same portion of the device.

In accordance with these and other objects which will become apparent hereinafter, the instant invention will now be described with reference to the accompanying drawings.

DETAILED DESCRIPTION OF THE INVENTION

Referring now to the drawings, one embodiment of the invention is there shown generally at numeral 10 in FIGS. 1 to 6. This embodiment 10 includes a housing 12 having a molded plastic housing front half 18 and a mating molded plastic rear housing half 28. The two housing halves 18 and 28 define a support base 14 at the bottom portion thereof supportable on a flat surface by bottom surface 14a in FIG. 3.

Figure 1:
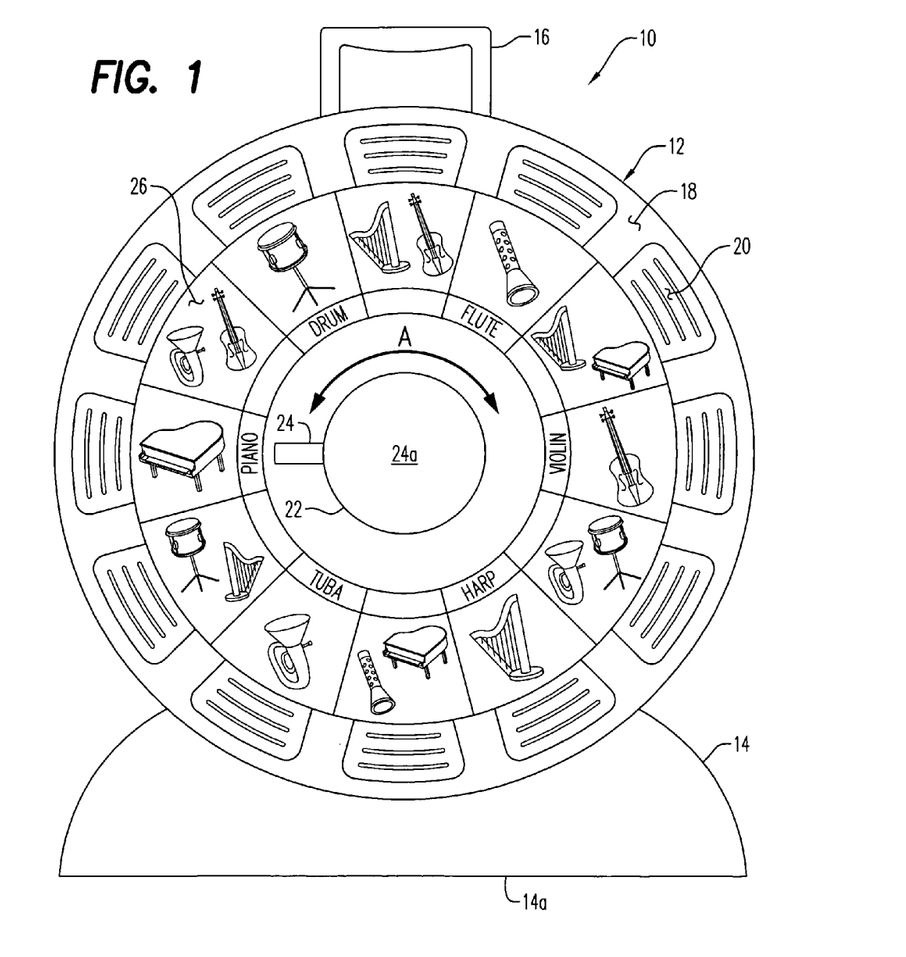
FIG. 1 is a front elevation view of one embodiment of the invention.
Figure 2:
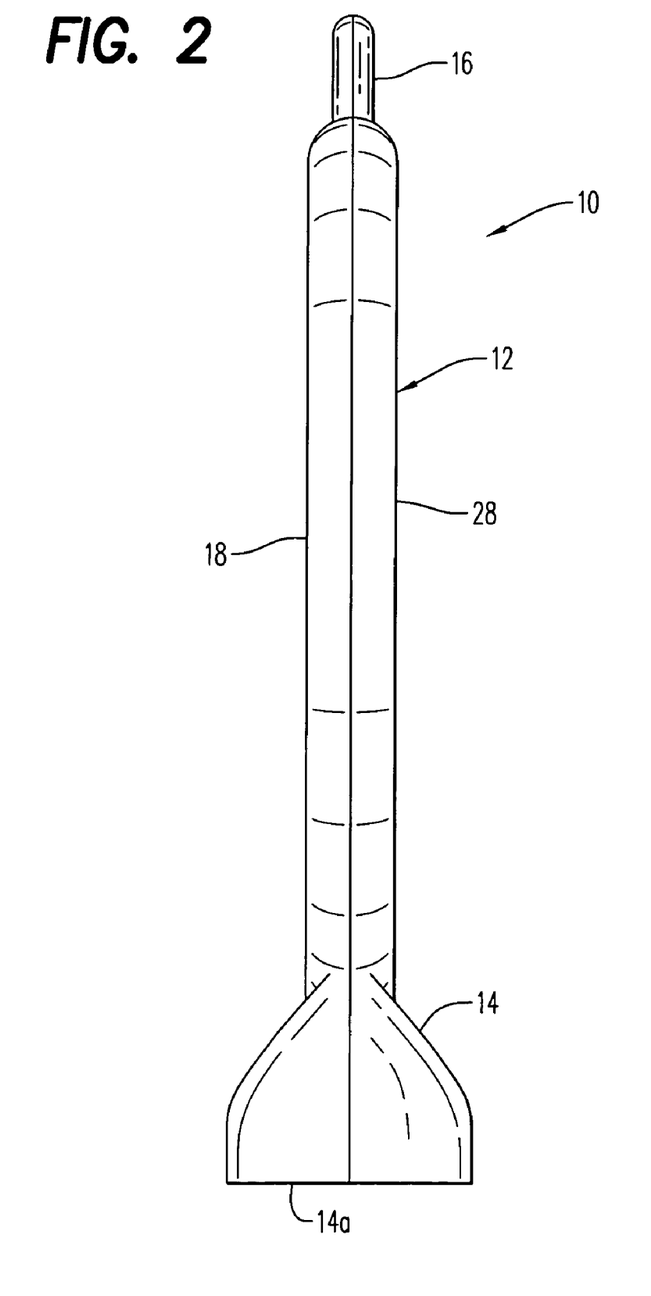
FIG. 2 is a side elevation view of FIG. 2.

The outer obverse forwardly facing surface of the front half 18 as seen in FIG. 1 includes a plurality of viewable indicia 26, each of which depicts a different object such as a flute, a harp, a piano, a tuba, etc. which produces or is capable of producing a recognizable sound, in this case, musical sounds or notes. Immediately adjacent to each of the viewable object indicia 26 are written or printed words describing the corresponding viewable indicia. Also radially outwardly positioned immediately thereto is a sound emitting area 20 formed of spaced slots adjacent each of the viewable indicia 26.

A rotatable selector 24 is also provided which is rotatable about a shaft 34 which defines central transverse axis of the housing 12 back and forth in the direction of arrow A. The child using the device or someone attendant thereto, would initially manually position the pointer 24 to be aimed at one of the selectable viewable indicia 26 for training or entertainment purposes. Thereafter, the central area 24a is depressed to energize or activate the device 10 into operation.

Figure 3:
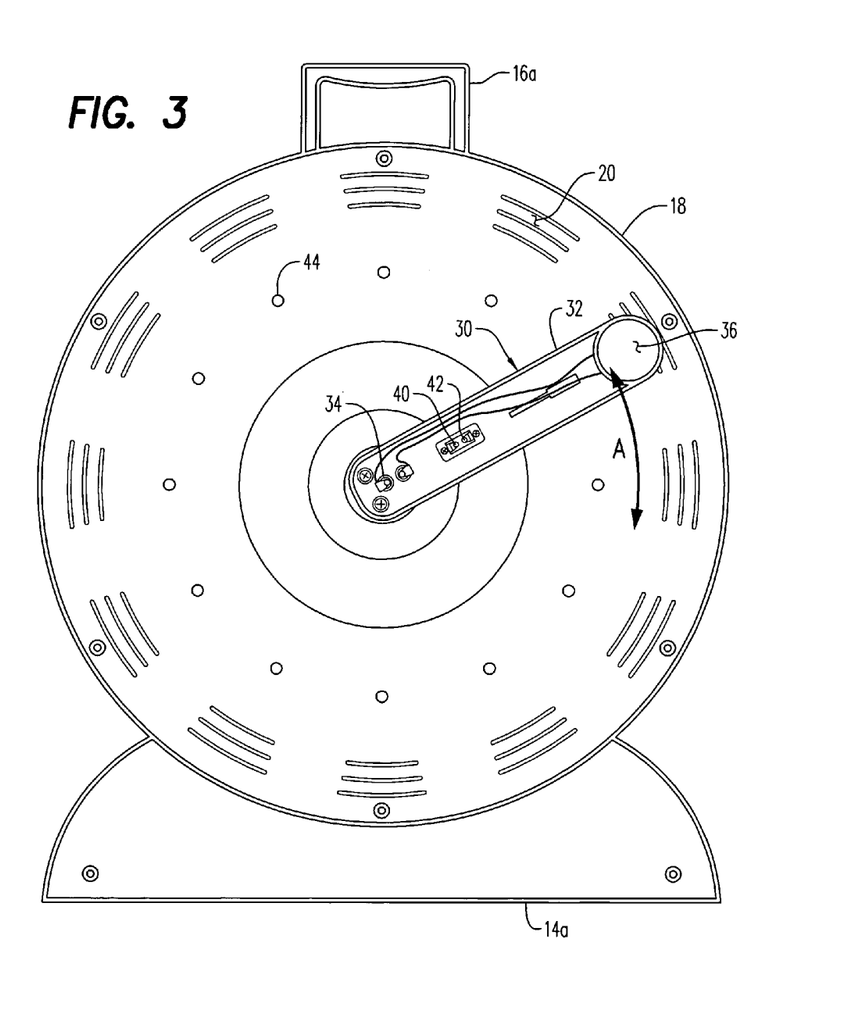
FIG. 3 is a rear elevation view of the invention as shown in FIG. 1 with the rear half of the housing removed.

Referring particularly to FIG. 3, when the pointer 24 is rotated, arm assembly 30 which is also pivotally attached on shaft 34 to the pointer 24, is also similarly rotated in the direction of arrow A in sequence therewith. Arm assembly 30 includes a sound producing device 36 connected at the distal end of arm member 32 which will emit synthesized sounds representative of each of the selected, viewable indicia 26 displayed on the front housing 12. Thus, when a selection is made by the manual rotation of the pointer 24 back and forth in the direction of arrow A, the sound emitting device 36 is positioned in alignment with and in close proximity to the inner surface of the corresponding sound emitting area 20. A series of evenly spaced detents 44 act in alignment with a small protrusion (not shown) on the reverse surface of arm 32 to properly align the sound emitting device 36 to be in alignment with the corresponding sound emitting area 20 selected by pointer 24.

Figure 4:
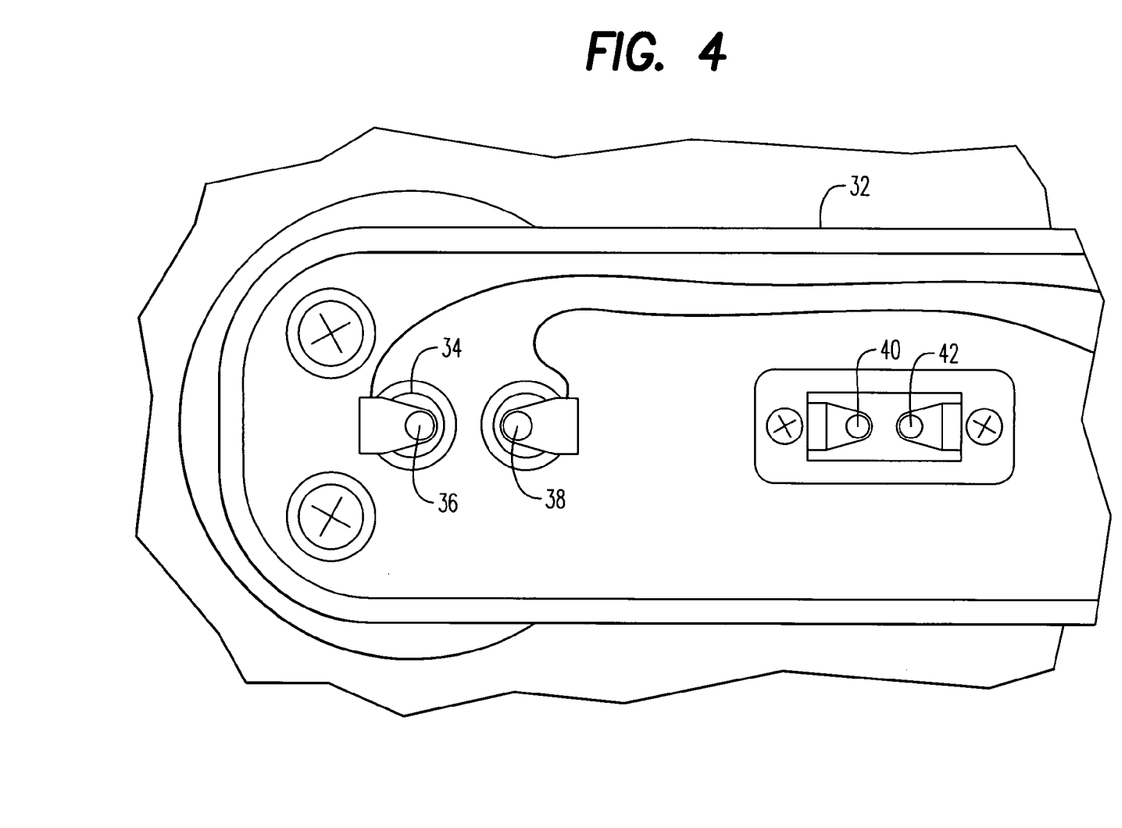
FIG. 4 is an enlarged view of the central pivotal portion of the arm assembly of FIG. 3.
Figure 5:
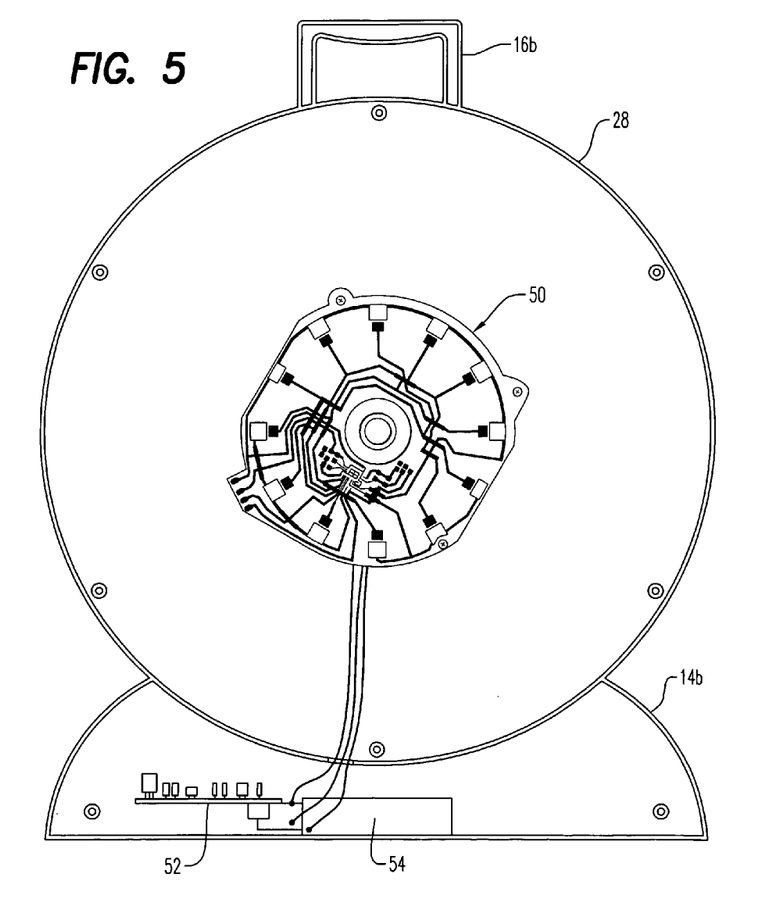
FIG. 5 is a front elevation view of the embodiment shown in FIG. 1 with the front panel removed.
Figure 6:
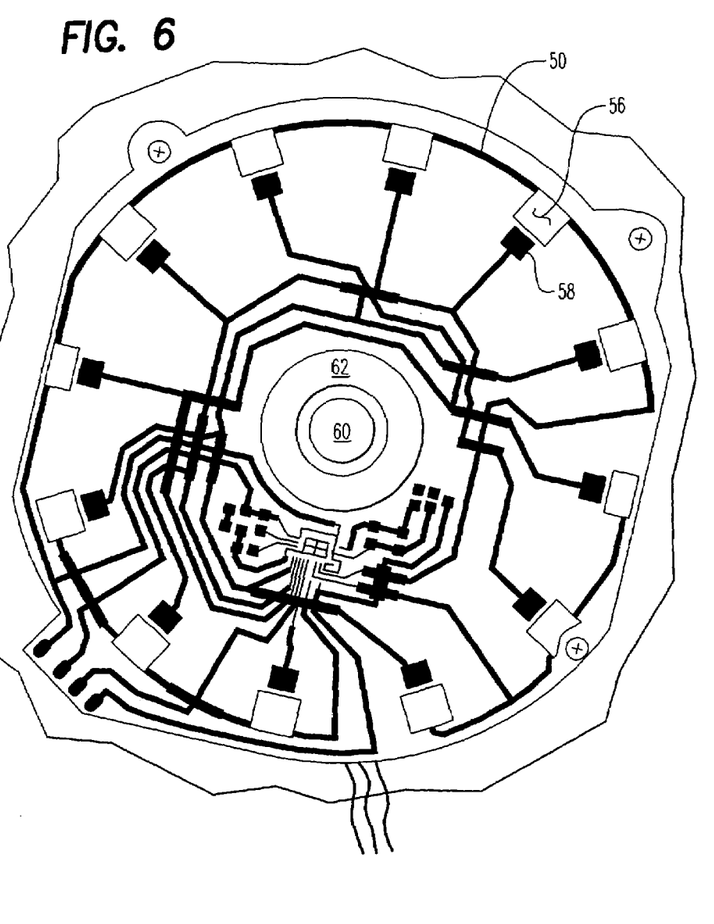
FIG. 6 is an enlarged view of the printed circuitry shown in FIG. 5.

An electronic controller 52 of conventional design is preprogrammed to produce electronic signals which, when received by the sound emitting device 36, will produce separate synthesized sounds simulating each of the sounds normally associated with the object displayed in the viewable indicia 26 on the front surface of the front housing 18. Powered by a storage battery 54, the electronic controller 52 sends and receives signals by a wiring harness shown to and from a printed circuit board 50. As best seen in FIG. 6, this circuit board 50 includes a plurality of electrical contact surface pairs 56/58 and two spaced apart circle and ring-shaped contact pairs 60 and 62 centrally positioned on the circuit board 50. Contact pads 56 and 58 are in operable engagement with contacts 40 and 42 on the opposing surface of arm 32 as best seen in FIG. 4 while the circular and annular shaped contact 60 and 62 of circuit board 50 are in electrical contact against contacts 36 and 38 of the central portion of arm 32. By this arrangement, the electronic controller 52 receives positional information with respect to pointer 24 and, when energized by manual depression of the central button 24a, produces a signal which causes the sound emitting device 36 to emit a synthesized sound which is characteristic of the selected object depicted in one of the viewable indicia selected by pointer 24. This synthesized sound is emitted from the sound emitting device 36 in alignment with the corresponding sound emitting area 20 so that the child is directed to look at the particular sound emitting area 20 corresponding to the viewable indicia 26 which was preselected by the positioning of the pointer 24. The learning function is thus enhanced by the child's focus of attention being drawn simultaneously to a graphic display of an object, the word description thereof, and the characteristic sound produced thereby.

By the use of this embodiment 10 of the device, when activated by depression of the central portion 24a after the pointer 24 has been positioned to aim at the desired object depicted in one of the viewable indicia 26, a corresponding sound will emanate from area 20 immediately adjacent thereto. When the child's gaze is focused on that portion of the front surface of housing half 18, the educational connection will be made between the particular sound which emanates from the sound emitting area 20, the graphic depiction of the selected object such as a piano, and the word "piano" immediately adjacent thereto. The attention drawn to these three representations of an object, the viewable indicia, including the printed description, the word describing the object, and the distinctive sound which the object emits provides a powerful educational tool for more rapidly establishing the connection association between the three symbols of the object itself.

Referring now to FIGS. 7 to 10, another embodiment of the invention is there shown generally at numeral 70 in the form of an educational cube. The housing 72 is formed of plastic material having softer exterior surfaces to reduce impact upon both exterior objects and the battery-powered electronic controller (not shown) contained therein which functions as previously described.

Figure 7:
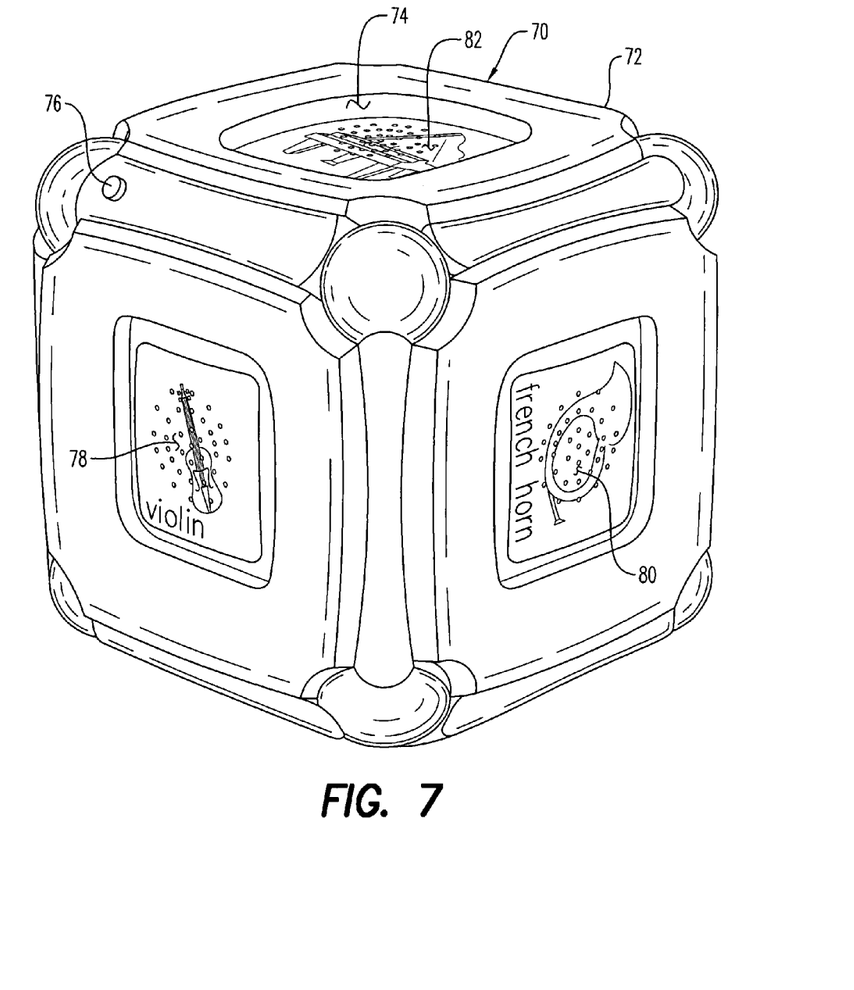
FIG. 7 is a perspective view of another embodiment of the invention.
Figure 8:
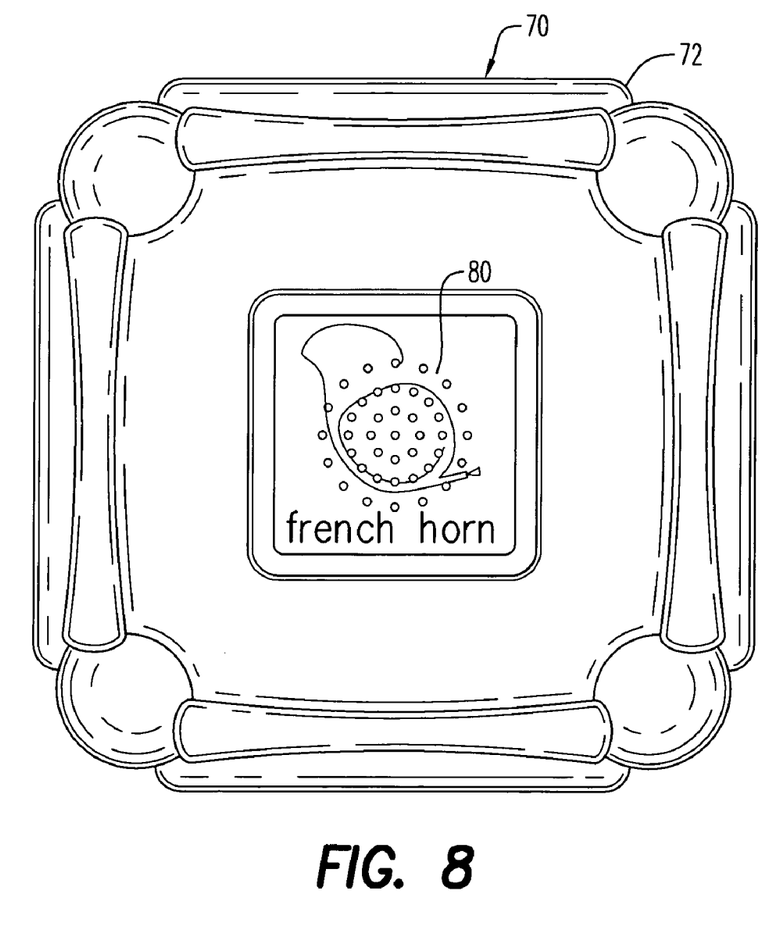
FIG. 8 is a side elevation view of FIG. 7.

This embodiment 70 includes depressible central areas 78, 80, 82, 84 and 86, one on each of the generally flat surfaces of the cube-shaped housing 72. Each of the central areas 78, 80, 82, 84 and 86 include viewable indicia of a particular musical instrument, namely a French horn, a harp, a piano, etc. In addition, the viewable indicia includes the printed word(s) describing the object.

Figure 9:
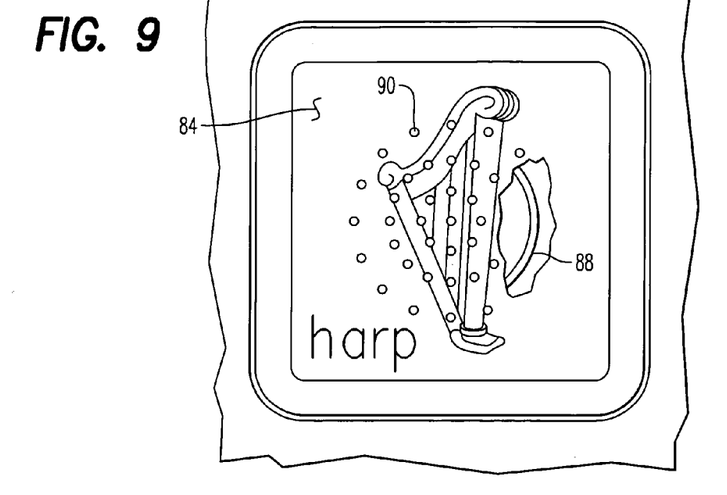
FIG. 9 is an enlarged broken view of one of the side surfaces of the invention shown in FIG. 7.
Figure 10:
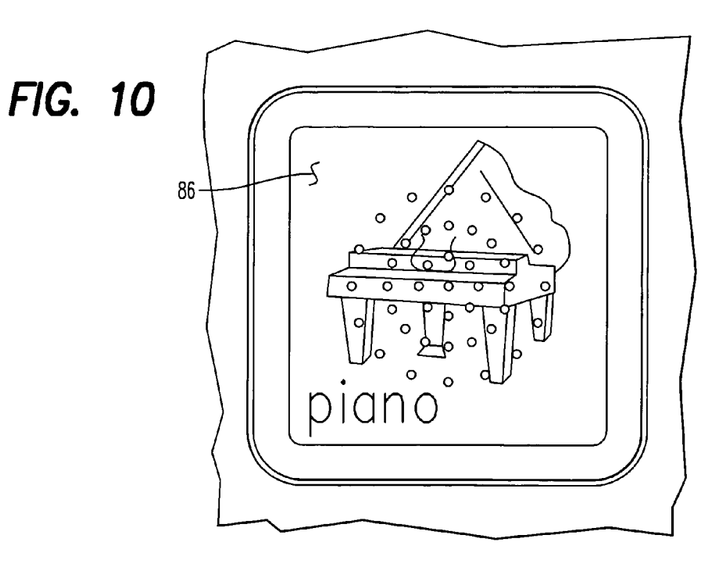
FIG. 10 is an enlarged view of another surface of the embodiment of the invention shown in FIG. 7.

Formed into each of the central areas are arrays of apertures shown typically at 90 in FIG. 9 which define a sound emitting area. As also seen in FIG. 9, positioned behind each of these central areas (typically 84) is a sound producing device 88 which will produce the corresponding synthesized sound of the object depicted on the central depressible area 84 associated with, or characteristic of, the viewable indicia depicted thereon.

By this arrangement, the child using this educational device 70 simply depresses one of the central portions 78, 80, 82, 84 and 86 to activate the electronic controller (not shown) within the cube-shaped housing 72 which then produces a signal delivered to the particular sound emitting device 88 positioned behind the viewable indicia displayed on the depressed central portion. The sound emitted from the corresponding sound emitting area 90 will cause the child's attention to be directed to and focused there so that all of the indicia representative of the object, i.e. the pictorial depiction, the word description, and the characteristic sound emitted from the object are all in focus at one time for the child's associative educational growth.

Figure 11:
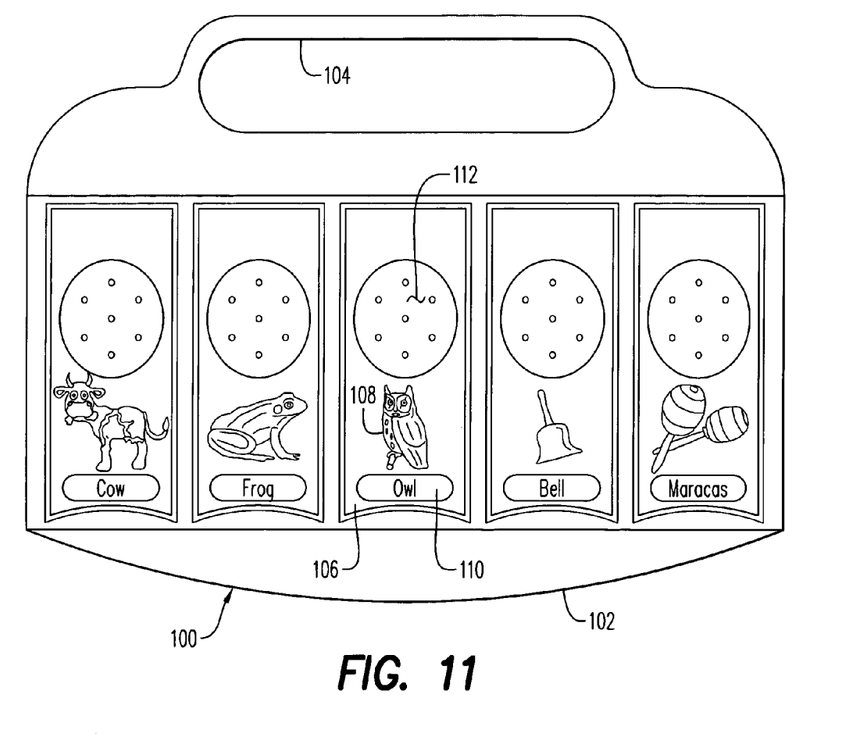
FIG. 11 is a top plan view of a third embodiment of the invention.

Referring now to FIG. 11, a third embodiment of the invention is there shown generally at numeral 100. This embodiment 100 includes a housing 102 which supportively holds a series of side-by-side depressible keys 106 each of which includes a viewable indicia depicting an object shown typically at 108, the word describing the object at 110, and a sound emitting area 112 behind which is a sound emitting device (not shown).

When a particular key 106 is manually depressed, it activates the electronic controller (not shown) within the housing 102 to produce an electronic signal which will be delivered to the sound emitting device (not shown) behind the corresponding sound emitting area 112. Again, the sound which is emitted from the particular sound emitting area 112 corresponds to the characteristic sound typically produced by the object depicted in the viewable indicia 108 and the word portion thereof at 110.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

The invention claimed is:

1. An audio-visual educational device: comprising
A housing including a first plurality of separate viewable indicia each representative of an object which produces an audible sound associated with the corresponding said object; a plurality of sound emitting areas of said housing each positioned in close proximity to one said viewable indicia wherein each said viewable indicia has a separate said sound emitting area positioned in close proximity thereto; an electronic controller operably mounted in producing and emitting each of said housing for selectively audible sounds one at a time from the corresponding said sound emitting area responsive to manual selection of one said viewable indicia at a time wherein the user receives an audible queue in the form of said audible sound emanating from the selected said sound emitting area to look in the direction of said audible sound thereby causing an association to be made between the selected said viewable indicia depicting the object and the corresponding said audible sound; wherein said electronic controller further comprising: an arm pivotally connected to a central transverse axis of said housing and a sound producing device positioned at a distal end of said arm and being operably connected to said electronic controller, said arm being thereby selectively manually rotatable to position said sound producing device in substantial alignment with one of said sound emitting areas corresponding to the selected said viewable indicia.

2. An audio-visual educational device as set forth in claim 1, wherein:
each said viewable indicia includes a pictorial and a word description of the corresponding said object.

3. An audio-visual educational device as set forth in claim 2, wherein: said housing has a generally upright disc shape with said viewable indicia and said sound emitting areas arranged in generally radially spaced orientation one to another adjacent a perimeter of said housing.

4. An audio-visual educational device used to teach children to associate a viewable indicia of a sound-producing object with its characteristic audible sound comprising: a housing including a plurality of separate viewable indicia each representative of said object which produces the audible sound associated with the corresponding said object; a said plurality of sound emitting areas and a sound producing devices each positioned in close proximity to one said viewable indicia wherein each said viewable indicia has a separate sound emitting area and a sound producing device in close proximity thereto; an electronic controller operably mounted in said housing for selectively producing and emitting each said audible sound from the corresponding said sound producing device and said sound emitting area responsive to manual selection of one said viewable indicia at a time wherein the user receives an audible queue to look in the direction of sound emanating from the selected sound emitting area thereby learning to associate the selected said viewable object with its corresponding said audible sound; wherein said electronic controller further comprising: an arm pivotally connected to a central transverse axis of said housing and a sound producing device positioned at a distal end of said arm and being operably connected to said electronic controller, said arm being thereby selectively manually rotatable to position said sound producing device in substantial alignment with one of said sound emitting areas corresponding to the selected said viewable indicia.

5. An audio-visual educational device as set forth in claim 4, wherein:
each said viewable indicia includes a pictorial and a word description of the corresponding said object.

6. An audio-visual educational device as set forth in claim 5, wherein: said housing has a generally upright disc shape with said viewable indicia and said sound emitting areas arranged in generally radially spaced orientation one to another adjacent a perimeter of said housing.

7. An audio-visual educational device for teaching a person to associate a viewable image of an object which produces a known audible sound with the known audible sound comprising: a housing including a plurality of separate viewable indicia and a plurality of sound emitting areas each of said viewable indicia representative of said object which produces the audible sound associated with the corresponding said object, the sound being emitted from the corresponding said sound emitting area; each said sound emitting areas of said housing in close proximity to the corresponding one of said objects; an electronic controller operably mounted in said housing for selectively producing and emitting or causing to be emitted each of said audible sounds one at a time from the corresponding said sound emitting area responsive to manual selection of one said viewable indicia at a time wherein the user receives an audible queue in the form of said audible sound to look in the direction of sound emanating from the selected said sound emitting area thereby associating the selected said viewable object with the corresponding said audible sound; wherein said electronic controller further comprising: an arm pivotally connected to a central transverse axis of said housing and a sound producing device positioned at a distal end of said arm and being operably connected to said electronic controller, said arm being thereby selectively manually rotatable to position said sound producing device in substantial alignment with one of said sound emitting areas corresponding to the selected said viewable indicia.

8. An audio-visual educational device as set forth in claim 7, wherein: each said viewable indicia includes a pictorial and a word description of the corresponding said object.

9. An audio-visual educational device as set forth in claim 8, wherein: said housing has a generally upright disc shape with said viewable indicia and said sound emitting areas arranged in generally radially spaced orientation one to another adjacent a perimeter of said housing.

* * * * *